United States Patent [19]

Sforza

[11] 4,111,594
[45] Sep. 5, 1978

[54] FLUID FLOW ENERGY CONVERSION SYSTEMS

[76] Inventor: Pasquale M. Sforza, 42 Mechanic St., Huntington, N.Y. 11743

[21] Appl. No.: 763,590

[22] Filed: Jan. 28, 1977

Related U.S. Application Data

[62] Division of Ser. No. 564,681, Apr. 3, 1975, Pat. No. 4,047,832.

[51] Int. Cl.² ............................................. F03D 1/04
[52] U.S. Cl. ........................................... 415/1; 415/2
[58] Field of Search ...................................... 415/2–4, 415/DIG. 1

[56] References Cited

U.S. PATENT DOCUMENTS

| 1,578,923 | 3/1926 | Schlotter | 415/2 |
| 2,694,357 | 11/1954 | Lee | 415/DIG. 1 |
| 4,045,144 | 8/1977 | Loth | 415/DIG. 1 X |
| 4,047,832 | 9/1977 | Sforza | 415/DIG. 1 X |

FOREIGN PATENT DOCUMENTS

| 992,353 | 10/1951 | France | 415/DIG. 1 |
| 606,119 | 11/1934 | Fed. Rep. of Germany | 415/DIG. 1 |
| 192,793 | 2/1923 | United Kingdom | 415/2 |
| 1,003,568 | 9/1965 | United Kingdom | 416/223 |

*Primary Examiner*—Everette A. Powell, Jr.
*Attorney, Agent, or Firm*—Morgan, Finnegan, Pine, Foley & Lee

[57] ABSTRACT

Fluid flow energy conversion systems employing aerodynamic flow-separation vortex generation for focusing the kinetic energy of flow in the working area of the turbine are disclosed herein in the context of wind power plants. As a consequence of this augmentation, fluid velocity acting on the rotor is increased by a substantial amount over the free stream velocity, resulting in substantial increases in power output for a given turbine configuration. The illustrative embodiments include simple flow separation, vortex augmenting surfaces, such as those found in delta planforms which in this context generate vortices and therefore function as aerodynamic "lenses"; these surfaces are oriented to the wind turbine so that generated vortices are directed at the turbine blades. The latter are configured to be driven by the vortex and drive in turn electrical or other power generating devices or machines. Provisions for varying the angle of attack of the augmentor surface for control purposes are also described as are configurations employing multiple augmentor surfaces and both slender body and bluff body augmentors. Also disclosed are vortex mixing techniques for controlling the wind gradient to achieve a more optimum wind velocity distribution and magnitude relative to the wind converter.

5 Claims, 36 Drawing Figures

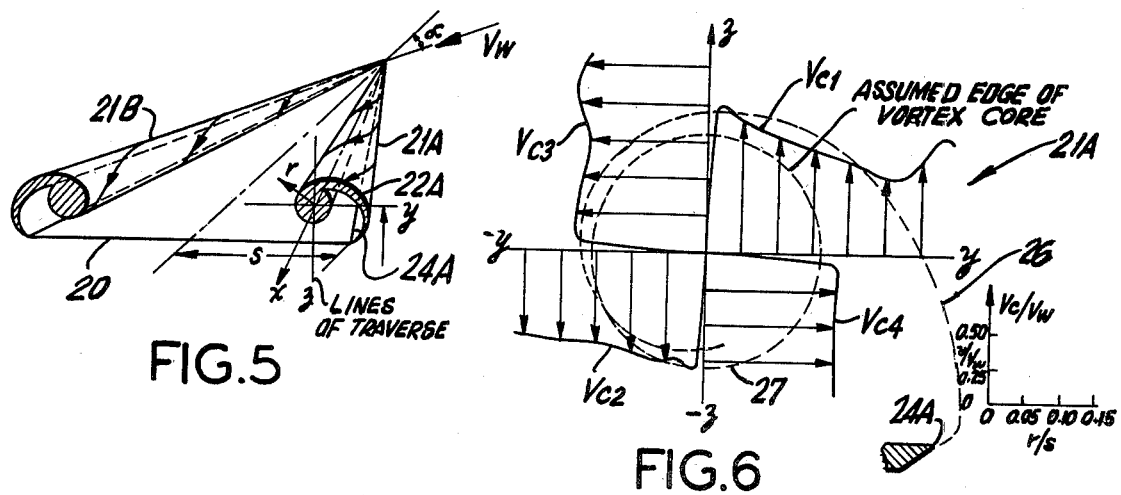
FIG.5
FIG.6
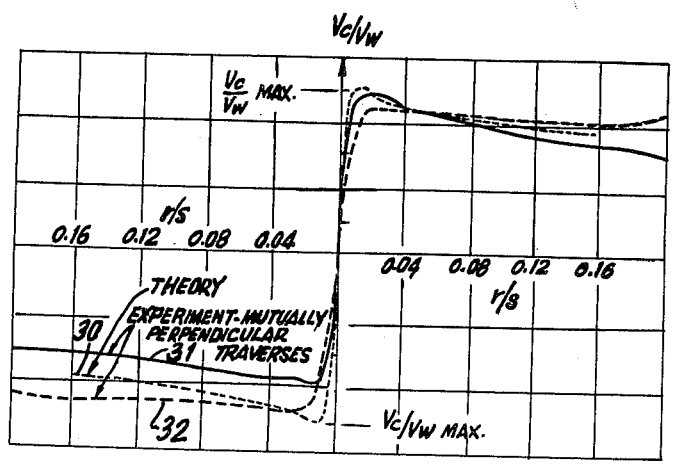
EXPERIMENTAL AND THEORETICAL PROFILES OF CIRCUMFERENTIAL VELOCITY $V_c$
FIG.7A
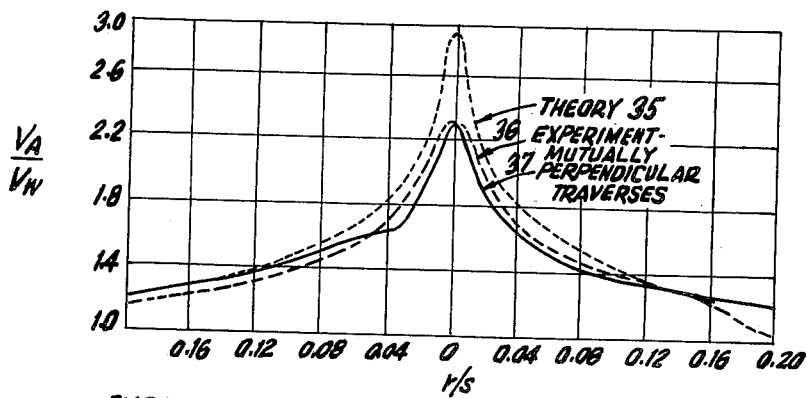
EXPERIMENTAL AND THEORETICAL PROFILES OF AXIAL VELOCITY $V_A$
FIG.7B

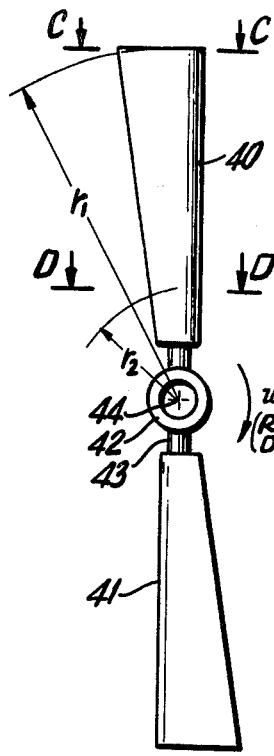
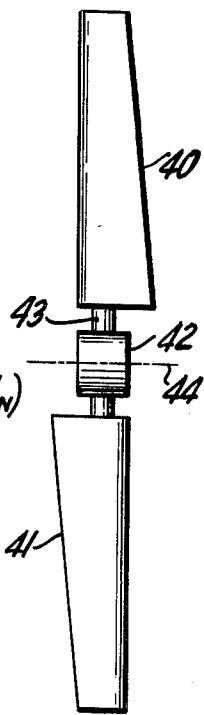
FIG.9A  FIG.9B
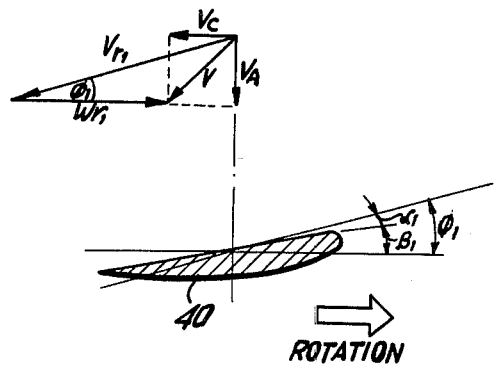
FIG.9C
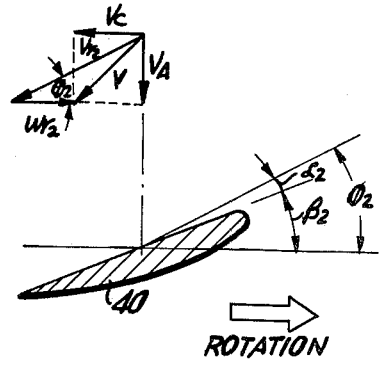
FIG.9D
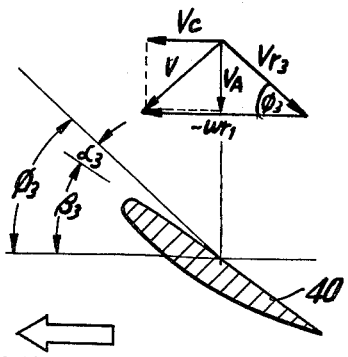
FIG.9E

FLUID FLOW ENERGY CONVERSION SYSTEMS

This is a division, of application Ser. No. 564,681 filed Apr. 3, 1975 now U.S. Pat. No. 4,047,832.

BACKGROUND

This invention relates to fluid flow conversion and, more particularly, to processes and structures for converting the kinetic energy of fluid flow (e.g. the energy associated with wind, tidal and river flow) into mechanical, electrical and other power forms. For illustrative purposes, the invention is described in terms of its application to the conversion of wind power into electrical and other forms of power for the purposes of replacing or supplementing fossil fuel and other power sources.

The ever growing recognition that fossil fuel sources are exhaustible, environmentally polluting, and susceptible to powerful political exploitation, has led to a search for alternate power sources. Considerable attention in recent years has consequently been directed to the natural wind as a power source. See, e.g, the NSF/NASA workshop proceedings, *Wind Energy Conversion Systems*, NFS/RA/W-73-006, Dec. 1973.

Extracting power from the natural wind has a number of outstanding advantages. The supply is virtually inexhaustible and non-polluting. While the wind has been used from the beginning of recorded history to provide power for sailing vessels, for the milling of grain, and for the pumping of water — and, more recently, for generating electricity — its full potential has not been exploited because of the primary reliance on systems employing hydroelectric, fossil fuel, and atomic power sources. This is particularly so in the power utility field where these conventional sources have enjoyed substantial economic advantages.

Certain limitations have impeded wider use of wind power. Wind has a relatively low energy density and fluctuates in velocity and direction.

BLADE SIZE

To extract commercial amounts of power from typical wind regimes, a relatively large turbine is required. In the case of a two bladed propeller type rotor, a blade diameter of 175 feet (53 meters) was required in the 1250 kilowatt experimental Smith-Putnam wind generator erected and operated during World War II in Vermont (see Putnam, *Power From the Wind*, Van Nostrand, Reinhold & Co., 1948). Other illustrative units built in various parts of the world have involved blade diameters of 98 feet (30 meters) to produce 100 kilowatts and 59 feet (18 meters) to generate 50 kilowatts. A recent design, the NASA/NSF mod zero requires a blade diameter of 125 feet to generate 100 kilowatts. Turbines or rotors employing the Magnus effect, the Savonius rotor, the Kumme design, and the Darrieus design likewise involve massive dimensions in order to extract commercial amounts of power.*

*See Putnam, op. cit., and Wilson et al., *Applied Aerodynamics of Wind Power Machines*, Oregon St. Univ.. May 1974.

This need to employ large turbines has serious consequences: heavy supporting structures, massive control systems, and complicated means such as coning arrangements for reducing or enduring vibration, and stresses on the blade and other elements, must be employed at very substantial capital costs. It would be highly desirable if the need for large rotor sizes could be ameliorated.

SITE SELECTION

A second substantial complication in wind energy conversion systems results from the vagaries of the wind regime itself. As a general rule, wind velocities vary widely in both magnitude and direction and the low velocity winds found in many areas are not even sufficient to get a practical large power system rotating. Finding a site where, for a particular size rotor, the wind regime is satisfactory represents a considerable undertaking. Many sites which are practical from other viewpoints are impractical because of wind conditions. Generally speaking, wind velocity increases with elevation, making height desirable for maximizing power output. However, there are many anomalies resulting from topographical irregularities, terrain surface conditions, and the like. In the case of the Smith-Putnam generator, a hilltop site (elevation 2000 feet) was selected on the assumption that the geometry of the site caused an increase of about 20% in the free air flow over the summit. After erection, test and operation over a period of time, it was found countrariwise, that the local velocity at the turbine was actually less than the free air velocity.

COMPLEXITY

While wind machines for generating low levels of power can be elegantly simple, the opposite is true where substantial output (e.g. above 50 kilowatts) is sought. Fluctuations in wind velocity impose substantial complications in rotor design, and in the control systems which ideally provide useful output at relatively low threshold velocities, regulated output over a wide range of velocities, and limited output when excessive velocity and gusts are encountered. One approach to this problem employs blade pitch control and torque limiting arrangements.* Also, some designs require complicated coning (blade hinging) provisions to limit the excessive loads which would otherwise occur during high velocity conditions (which may involve velocities in excess of 100 mph).

*Large rotors may require cyclic pitch control as a consequence of the vertical wind velocity gradient.

Variability of the wind direction also presents serious problems in large power designs, requiring in some cases elaborate yaw control systems to head the rotor into the free air stream.

EFFORTS TO INCREASE VELOCITY

It has long been recognized that the foregoing disadvantages could be lessened by increasing the effective velocity of the wind at the rotor or turbine to increase the output power or permit smaller rotors for a given output power. This, of course, is one of the main motives in selecting a site having airfoil type topography, or topography providing a diffuser effect; hopefully such conditions cause an effective increase in local wind velocity. Proposals have also been made to use natural or constructed rotor "shrouds" to increase the free stream velocity in the region of the turbine.** (See, for example, pages 60, 102 and 103–106 of *Wind Energy Conversion Systems*, supra.) Utilization of existing or modified terrain for such purposes drastically limits site availability, can represent a costly undertaking, and tends to make wind directions critical. Artificially constructed shrouds which have been proposed appear to involve massive dimensions with all of the complications associated with large, heavy movable structures.

Various proposals are also found in the patent literature. These include arrangements employing bell mouth inlets, deflecting surfaces, vanes and the like to introduce diffusion or deflection effects (U.S. Pat. Nos. 91,457; 147,282; 698,409; 705,922; 757,800; 1,783,669; French Pat. No. 1,062,631).

** and to improve rotor wake expansion characteristics

SUMMARY OF DISCLOSURE

It is a principal object of the invention to ameliorate the foregoing disadvantages of wind energy conversion systems by augmenting the free stream velocity through the use of a flow separating vortex generating system thereby increasing the effective wind velocity acting on the turbine. Thus, the diffuse flow of the natural wind is concentrated into a focused or coherent pattern so that extraction of the natural wind energy may be more effectively and economically accomplished. Test data indicate that by such use of aerodynamic augmenting means, twofold increases in velocity are attainable with the possibility of even higher increases ranging up to 8 times the free stream velocity. Since the power in a unit area of wind for a given air density is a function of the cube of the wind velocity, substantial increases in generated power are thus attainable. With the vortex augmentation of the invention, practical output power is also attainable with smaller turbines, thus mitigating many of the aforementioned disadvantages associated with large rotating structures.

In addition to its velocity augmentation, the vortex generating systems of the invention may be adjustable in angle of attack, thereby affording additional means for controlling the performance of the wind power plant. Consequently the rotational speed of the turbine may be maintained more nearly constant in the face of changes in the natural wind speed by changing the attitude of the vortex augmentor surface. More constant turbine speed ensures more constant generator speed thereby easing the requirements of speed control systems. In addition, constant speed operation allows the system to remain close to the design point for best efficiency as well as maximum reliability.

The velocity field generated by the flow separating vortex augmentor surface also permits a higher turbine rotational speed which is closer to the operational speeds of many available generators. The requirements in many applications for step-up transmissions are thereby ameliorated or eliminated, again reducing costs.

Because the vortex augmentor concentrates the available wind energy, operation at wind speeds lower than those required to operate conventional wind power systems is feasible. This renders accessible whole new geographic areas for wind energy conversion systems; viz, those regions where winds are always blowing, but at generally low speeds.*

*Tower requirements are also eliminated or mitigated.

Since the only fuel used by the system is the natural wind, there is no pollution. Environmental effects, particularly in the case of power plants, are an important current issue and the nonpolluting nature of these wind systems constitutes a decided advantage. Another environmental issue is that of aesthetic appeal. The functional nature of the Vortex Augmentor Concept generally requires a "clean" aerodynamic design and, as such, will strike few as an eyesore.

The improvements derived from the foregoing features may also be enhanced by vortex mixing techniques, described hereinafter, whereby the natural wind gradient is disturbed to produce higher velocities at the augmentor site.

The above and other objects and advantages of the invention will be apparent in the following description of exemplary embodiments thereof, or may be learned by practice with them.

THE DRAWINGS

Serving to illustrate applications of the invention to wind conversion systems are the drawings of which:

FIGS. 5 and 6 are perspective and corss-sectional schematic views further illustrating velocity conditions in the vortices, with the augmentor aligned with the wind direction.

FIGS. 7A and 7B are coordinate graphs illustrating, respectively, circumferential and axial velocity distributions in the vortex region.

FIGS. 9A and 9B are schematic front and side elevation views, FIGS. 9C and 9D are cross-sectional views along lines CC and DD, respectively, of FIG. 9A, and FIG. 9E is a cross-sectional view, illustrating turbine blade characteristics useful for energization by the vortex stream.

DETAILED DESCRIPTION

Figure 1:
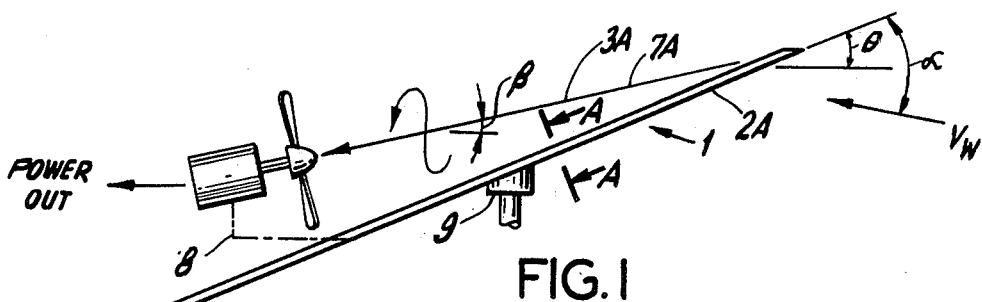
FIGS. 1 and 2 are elevation and plan schematic views, respectively, of a vortex augmentation system according to the invention.

For implementing the concepts generally described above, aerodynamic surfaces, such as slender bodies or bluff bodies, are oriented to interact with natural wind of relatively low density energy to thereby generate discrete vortices of high kinetic energy density. Suitably designed turbines are utilized to extract this focused energy from the compacted fields.

VORTEX FORMATION BY MEANS OF SEPARATION

Perfect fluid flow theory indicates that flow over a body will remain smooth and attached everywhere over that body. In practice, it is observed that all flows separate from a body at some point and in so doing form a wake behind the body. The point at which such separation takes place, and the character of the wake thus produced depends in large measure upon the curvature of the body which can vary from zero curvature (flat surface) to infinite curvature as at a sharp corner or edge. The sharper the curvature the greater the likelihood of separation. Behind the point of separation a vortex is formed, the intensity and stability of which is dependent upon the nature of the separation process. Because they are induced by flow separation, these vortices are to be distinguished from diffuse angularly rotating flow as may occur when flow passes through a fixed turbine or is angularly deflected by curved vane configurations (see U.S. Pat. No. 756,372). Separation-induced vortices can concentrate within their whirling flow field energy which was previously diffusely distributed. It is this fact of vortex flows which is exploited herein.

EDGE SHAPES AND THEIR CONSEQUENCES

As mentioned above, a principal factor in the generation of the vortices is the nature of the surface curvature. A high curvature, e.g., sharp edge will fix the point of separation to that edge and, in general, provide good conditions for production of an intense vortex. In addition, for such a configuration, dependence on the Reynolds Number is minimized thus facilitating scale model testing with a greater level of confidence. (The Reynolds Number is formed by the product of density, stream velocity and body dimension, divided by fluid velocity; it provides the analyst with information respecting the relative importance of inertia forces and viscous friction forces in a fluid flow.)

SLENDER BODIES: PLANFORMS

There is a wide range of planform shapes useful for the generation of vortices. For particularly coherent vortices the body is preferably plate-like, that is the thickness should be much less than the span and the length. Strong vortices will be produced by plate- or wing-like bodies with low aspect ratio (the ratio of the span squared to the planform area). A particularly effective combination of these desirable qualities is to be found in low aspect ratio planforms with swept-back leading edges, the flow over which is illustrated herinafter.*

* See also *Incompressible Aerodynamics*, edited by B. Thwaites, Oxford, 1967, particularly Chapter VIII.

CAMBER

The plate-like structure can be curved in the chordwise (lengthwise) direction to achieve certain properties in the flow field over the structure. Since the vortices form on the leeward side of the surfaces considered herein, it is important to favorably affect the flow in that region. Experiments have shown that for such configurations, positive camber (convex toward the leeward side), stabilizes and intensifies the vortices while negative camber does the opposite.

In some embodiments, means can be provided for altering the curvature of the vortex generator surface. The simplest camber change may be effected by hinging the surface along some spanwise line in analogy to a simple flapped airplane wing. Further control may be achieved by multiple hinges or by fabricating a flexible surface with a suitable mechanism for changing the curvature of the surface.

AN EXEMPLARY SYSTEM CONFIGURATION

Figure 2:
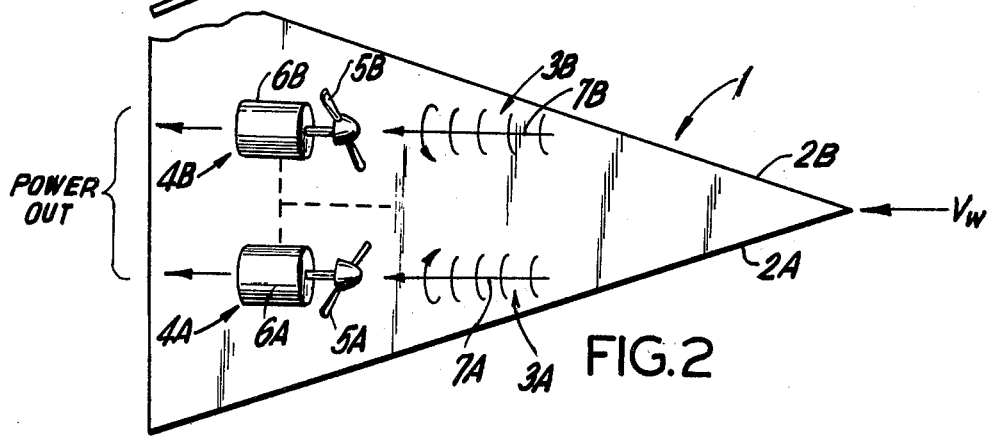

In the first exemplary embodiment, schematically illustrated in FIGS. 1 and 2, a vortex generating structure 1 is pointed into the ambient wind represented by the velocity vector $V_W$, at angle of attack $\alpha$. Augmentor 1 which is inclined at a pitch angle $\theta$ is in this embodiment in the form of a low aspect ratio delta planform of sharply swept back configuration having high curvature* leading edges 2A, 2B sharply defining the flow separating boundaries, as also illustrated in the cross-sectional view, FIG. 3.**

* i.e., sharp
** FOR a total span $a$ the illustrative planform has a centerline approximately $2a$ long and an enclosed tip angle of 30°.

The ambient wind $V_W$ is intercepted by augmentor 1 which generates from leading edges 2A, 2B, respective vortices 3A and 3B, the axes of which, designated 7A and 7B, respectively, are inclined at angle $\beta$ to the horizontal.

Aligned with each vortex axis is a turbine 4A and 4B, respectively. The turbines include two bladed rotors 5A and 5B coupled to the shafts of which are electrical generators 6A and 6B. The rotational axis of each turbine is aligned with the respective vortex axis 7A and 7B and the rotor diameters are each approximately one quarter of the span so as to be approximately coextensive with the developed vortex swirls 3A and 3B.

The turbine system 4A, 4B is coupled to the augmentor 1, as schematically illustrated at 8, and suitable means, not shown, may be included for rotating the combined structure on bearing 9 so that it heads into the ambient wind, $V_W$, as illustrated.

Various known proposals including those described in the previously cited references may be adopted for regulating the power output of the generators 6A and 6B in the presence of varying natural wind velocities $V_W$. These control arrangements will depend upon particular applications; for example, the output power may be fed to a power storage system, or utilized directly, or fed into power mains to supplement utility power.

Operation of the illustrated system is based on the fact that under certain predictable conditions the vortices appear in the flow field and these vortices are efficient concentrators of kinetic energy.* As shown, this energy generally occupies a localized region which may be small compared to the characteristic dimension of the surfaces which generate the vortices.

A natural example of this phenomenon is the tornado where the vortex flow field embodies a particularly violent concentration of flow energy. Another example involves the vortices emanating from the wing tips of an aircraft. These trail out behind the aircraft and because of the concentrated swirling motion in them, they constitute a danger to following aircraft, a condition which has led to a great deal of research on vortex phenomenon (widely reported in the literature) including an international conference in 1970 and a professional study seminar in 1974 conducted by the American Institute of Aeronautics and Astronautics; see Olsen, et al., *Aircraft Wake Turbulence and Its Detection*, Plenum Press, N.Y. 1971; *Vortex Wakes of Large Aircrafts*, AIAA Professional Study Course, June 15, 16, 1974.

Figure 4A:
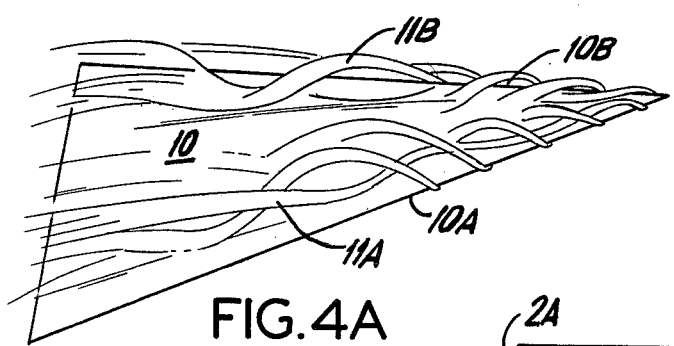
FIGS. 4 and 4A are plan and isometric views, respectively, of a slender body augmentor of the delta wing type for use in the systems of the invention with vortex generation illustrated with the aid of smoke trails.
Figure 4:
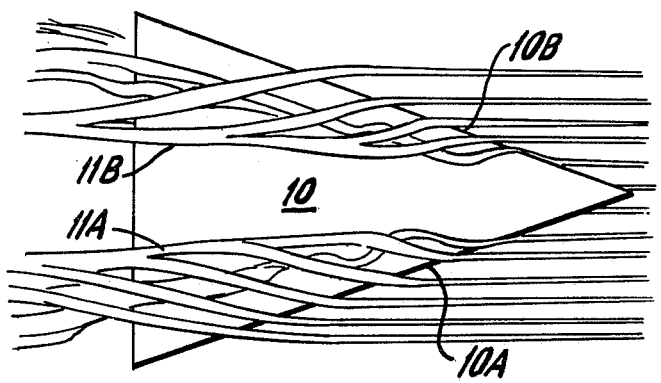

The utilization of these vortices in the invention herein is aided by a reference to graphic portrayals thereof such as shown in FIGS. 4 and 4A where augmentor 10 in the shape of a low aspect ratio delta planform, having sharply defined leading edges 10A and 10B, generates the characteristic swirling vortex patterns 11A and 11B. These illustrations are patterned after those observed in a wind tunnel test employing smoke rakes.**

** See Thwaites, *Incompressible Aerodynamics*, supra.

An indication of the energy in these swirling flow regions, the magnitude of which is dependent upon the attitude of the augmentor surface, i.e., its angle of attack (and of course its azimuth angle relative to wind direction) can be further appreciated by reference to FIGS. 5 through 7B. Here the velocity components in the vortex are given in the form of the ratio $V_C/V_W$ and $V_A/V_W$, where $V_C$ is the circumferential component, $V_A$ is the axial component and $V_W$ is the (undisturbed) oncoming wind speed.

VELOCITY CONDITIONS

The basic pattern of flow over a slender delta wing 20 of span $2s$ at incidence is shown in FIG. 5, with the augmentor 20 intercepting the undisturbed ambient wind $V_W$ at angle of attack $\alpha$, to generate vortices 21A and 21B.

Velocity conditions at a cross-section of one of the vortices is further defined in FIG. 6 which provides a profile of the circumferential velocity $V_C$ at cross-sectional site 22A of vortex 21A. The cross-sectional site is defined by a coordinate axis system $x, y, Z$, and radius $r$ as shown in FIG. 5. Dimension $s$ represents the distance in the spanwise direction from the center line of the delta 23 to one of the swept back leading edges 24A at the streamwise location for which the velocity profiles of FIG. 6 are presented.

VORTEX CIRCUMFERENTIAL VELOCITY

The variations of circumferential velocity component $V_C$ along the $y$ axis as $y$ varies from 0 in the positive and negative directions is shown by the respective curves $V_{C1}$ and $V_{C2}$. Variations of $V_C$ along the $z$ axis for positive and negative values of $z$ are depicted by the curves $V_{C3}$ and $V_{C4}$, respectively.

The boundary defined by the broken line 26 is intended to represent the spiral form of the shear layer which forms the vortex while that of 27 defines the estimated edge of the vortex core. The depicted data are taken from Hall, M. G., "A Theory for the Core of a Leading Edge Vortex," J. of Fluid Mechanics, 11, p. 209, 1961.

Magnitudes of circumferential component $V_C$ are depicted in the plots of FIG. 7A where the ratio of $V_C$ to the ambient wind $V_W$ are plotted as a function of the ratio $r/s$. (Curve 30 represents theoretical values, while 30 and 31 are experimental values for two mutually perpendicular traverses, respectively.) The maximum value of $V_C$ observed close to the vortex axis ($r=0$) is reported by Hall (ibid) to be close to the free stream value $V_W$, i.e. $V_C/V_W \approx 1$, while tests reported by Hummel, in *Untersuchungen uber das Aufplatzen der Wirbel an Schlanken Deltaflugeln** indicate that $V_C$ is over 50% larger than $V_W$.

* Zeitschrift fur Flugwissenshaft, 13, 1965, Heft 5

VORTEX AXIAL VELOCITY

Values for the axial velocity $V_A$ in the vortex region are represented in FIG. 7B wherein there is plotted theoretical (35) and experimental (36 and 37) values of axial velocity $V_A$ normalized to the ambient wind $V_W$ as a function of the ratio $r/s$. The normalized maximum axial velocity in the region about the axis of the vortex, $r/s \approx 0$, is approximately 2.2 according to Hall (ibid) and 2.6 according to Hummel (ibid). Even for values of $r$ as large as one-fifth the total value of $s$, the axial velocity still exceeds the undisturbed velocity $V_W$.

NET VELOCITY

Since the absolute velocity in the vortex region is given by the square root of the sum of the squares of the two components $V_A$ and $V_C$, it is clear that this absolute velocity is substantially larger than the free stream velocity.

Thus, by using turbines situated as illustrated in FIGS. 1 and 2 having a blade diameter sized according to vortex dimension, e.g., on the order of a quarter of the semi-span $s$ of the delta,* substantially larger energy extraction is attainable than would otherwise be the case with such turbines operating alone in free stream. This system of velocity multiplication also provides potential for smaller, highly-loaded turbines with all their advantages and, of course, also includes amenability to alteration of the incidence of the delta so as to maintain more nearly constant speed turbine operation in the face of varying wind speeds. It also affords the potential for operating at lower wind speeds than is the case in an unaugmented system.

* as measured at the streamwise location of the planes of the rotors

TURBINE CONFIGURATION

An exemplary blade configuration suitable for use with the vortex system previously described is seen in FIGS. 9A through 9E.

The exemplary rotor, of radius r1, includes two blades 40, 41 and rotates in the direction shown with angular velocity $w$. Blades 40 and 41 are each connected to hub 44 by by a respective strut 43.

The axis 44 of the rotor is aligned with the axis of the vortex velocity field generated by the augmentor surface (see e.g. FIGS. 7A and 7B). In addition to this velocity field there is the velocity due to the rotation of the rotor which is equal to the product $wR$ where $R$ is the radial distance measured from the center of rotation 44. Therefore, each element of the blade travels at a different velocity than its neighboring elements and this effect must also be taken into account in designing the blade geometry.

An exemplary blade profile at section C—C* of the rotor blade is shown in FIG.. 9C. In this illustration the relationship between the various velocity components of the flow are depicted by the adjacent vector diagram. The velocity components due to the vortex alone are shown as $V_C$ and $V_A$. When added vectorially they yield the resultant velocity vector $V$. This vector $V$ is the absolute velocity in the vortex flow field relative to a stationary system of coordinates. The blade at the tip, however, is traveling at a linear rotational speed equal to $wr1$. Consequently, the velocity relative to the blade, $V_{r1}$, is given by the vector V minus the vector $wr1$ as shown in FIG. 9C which also illustrates that the relative velocity to the blade is inclined at an angle $\phi_1$ to the plane of rotation.

* radius = r1

In order to have the airfoil section of the blade deployed at the proper angle of attack $\alpha_1$, FIG. 9C, it is necessary to fix the geometric pitch angle to a value $B_1$, as illustrated.

A section D—D of blade 40 and 41 near the hub 42 is shown in FIG. 9D. The same vector operations for the applicable velocities are depicted in the adjoining vector diagram. It is to be noticed that the major change in the velocity diagram in this case is due to the fact that as the hub is approached the linear rotational speed drops, since it is proportional to the radius from the axis. This reduction in linear rotational speed tends to require the geometric pitch angle to be greater than that value at the tip, i.e. $\beta_2$ is greater than $\beta_1$. It is thus evident that for best operation the rotor blades of this exemplary embodiment must be designed so as to provide the proper distribution of geometric pitch angle as a function of distance from the axis along the blade.

In implementing the vortex augmentor concept, it is also possible to allow the rotor to rotate in the same direction as that of the vortex, in contrast to the cases (FIGS. 9C, 9D) treated previously which have all considered the blade to rotate against the direction of rotation of the vortex. A profile and vector diagram of the former case is shown in FIG. 9E. Here it is clear that the circumferential velocity component of the vortex, $V_C$, is in the same direction as the linear velocity of the blade due to rotation. The linear rotational speed, again considering a location near the blade tip as in FIG. 9C, is seen to be $-wr1$. The resultant velocity relative to the blade is now $V_{r3}$. In this case we see that by rotating with the vortex the geometric pitch angles are increased and the magnitude of the resultant velocity vector $V_{r3}$ is reduced from the value in the previous case of $V_{r1}$. Since the drag of the rotor will be proportional to $(V_r)2$, the case of rotation with the vortex will experience less drag than the case of rotation against the vortex, for the same rotational speed $w$ or, alternatively, the blade that rotates with the vortex may spin at higher angular velocity $w$ than the blade that rotates opposite to the vortex, for the same level of drag.

It is clear that there is a major difference between the vortex augmentor velocity field and the undisturbed wind velocity field and that the sense of rotation of the rotor can be an important factor in rotor design for the augmented case, whereas in the unaugmented case there is symmetry insofar as choice of rotation is concerned. In the augmented case two choices for direction of rotation are available; the ability to choose one or the other allows a greater latitude in design of rotors for such systems.

POWER POSSIBILITIES

The delta planforms described above generate twin vortices in which the wind turbines operate. As shown with reference to FIGS. 5–7B, the velocity field within the vortex is primarily in the axial and tangential direction and the velocity diagrams for the turbine blades are thus different than those applicable to the conventional unaugmented wind generator case. By use of a computer program based upon blade element theory which takes into account the variable oncoming velocity field due to the vortex, together with certain parametric studies, the power generating possibilities of the augmentor systems may be assessed.

For the ideal case in which no losses are assumed, power output may be calculated for a single wind turbine of given radius under the following conditions:

(a) No augmentation; the turbine acts on the given free stream wind velocity.
(b) Augmentation by the slender body vortex velocity data as given by Hall (ibid). Here the velocity field is altered from the undisturbed free stream by the action of the vortex generator.
(c) Same as (b) but with the vortex data given by Hummel (ibid).

Figure 8A:
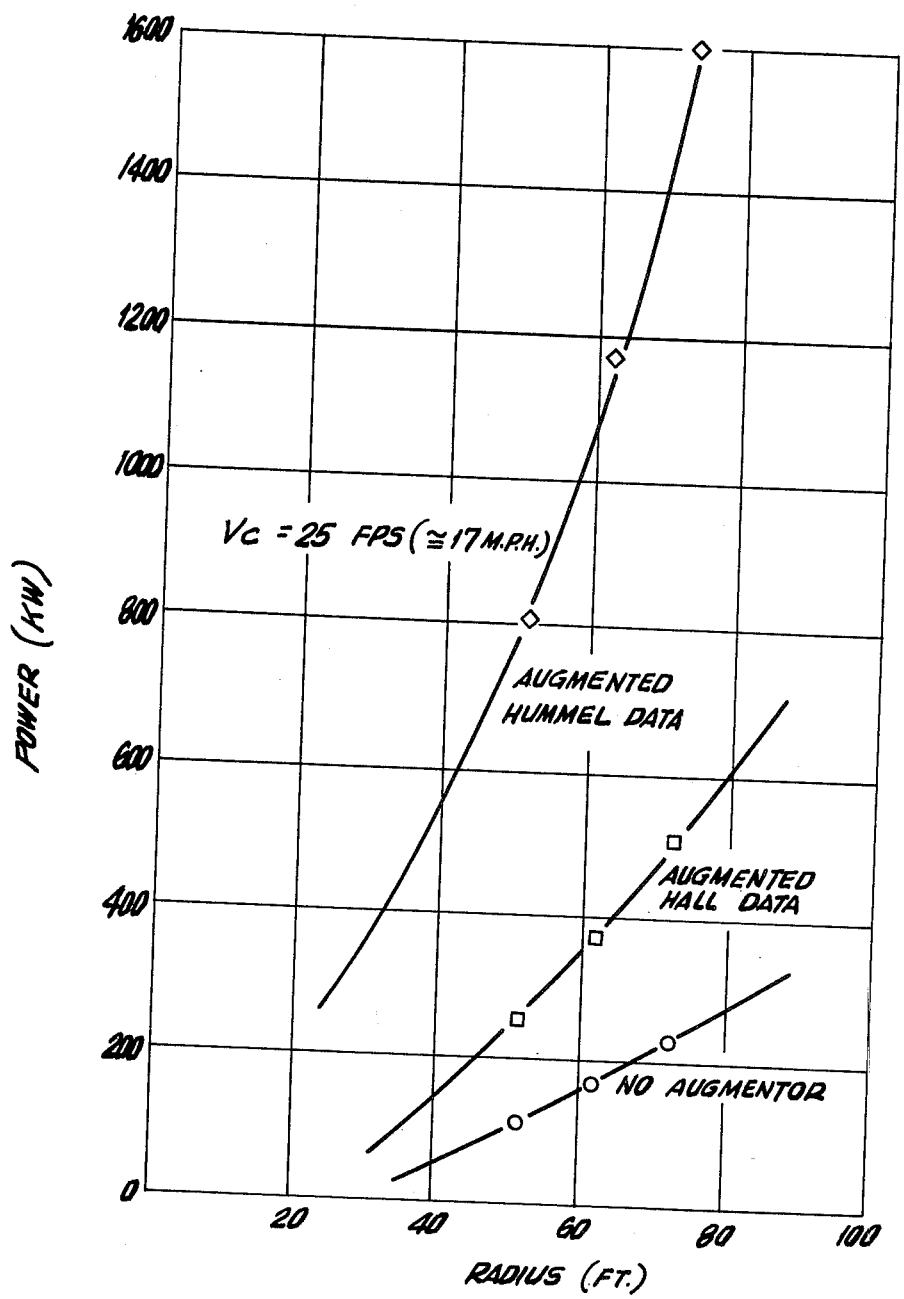
FIGS. 8A and 8B are coordinate plots of power (ideal, at turbine shaft) as a function of blade diameter under various conditions.
Figure 8B:
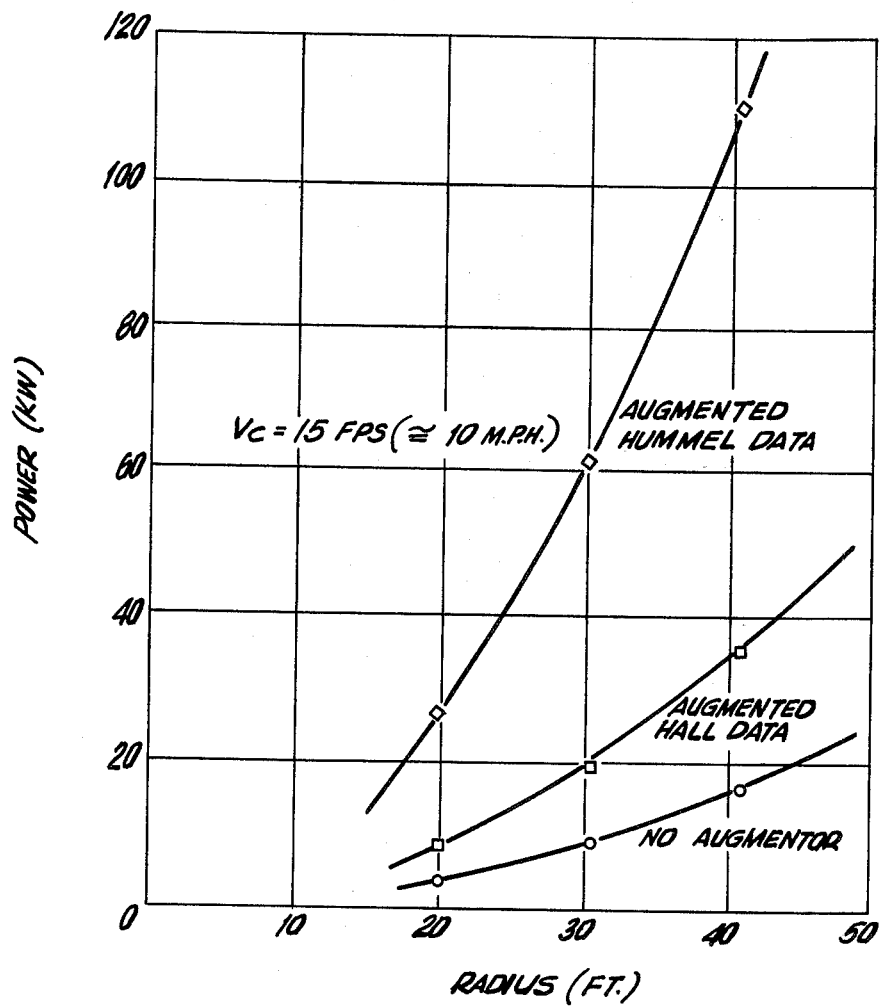

The results of power output as a function of turbine radius for individual wind turbines operating in the three modes described above are shown in FIGS. 8A and 8B for the wind velocities of 25 FPS (ca 17 mph) and 15 FPS (ca 10 mph), respectively. In the calculations, 20% of the radius was eliminated from the blades in order to account for hub losses. The power magnifying effect of the augmentation concept in increasing output for a given size blade is evident, as is the potential for reduction in blade size for given power output. Also evident is the capability of the augmentation systems for generating relatively high power at lower speeds than conventional systems.

CONTROL SYSTEMS

Figure 10:
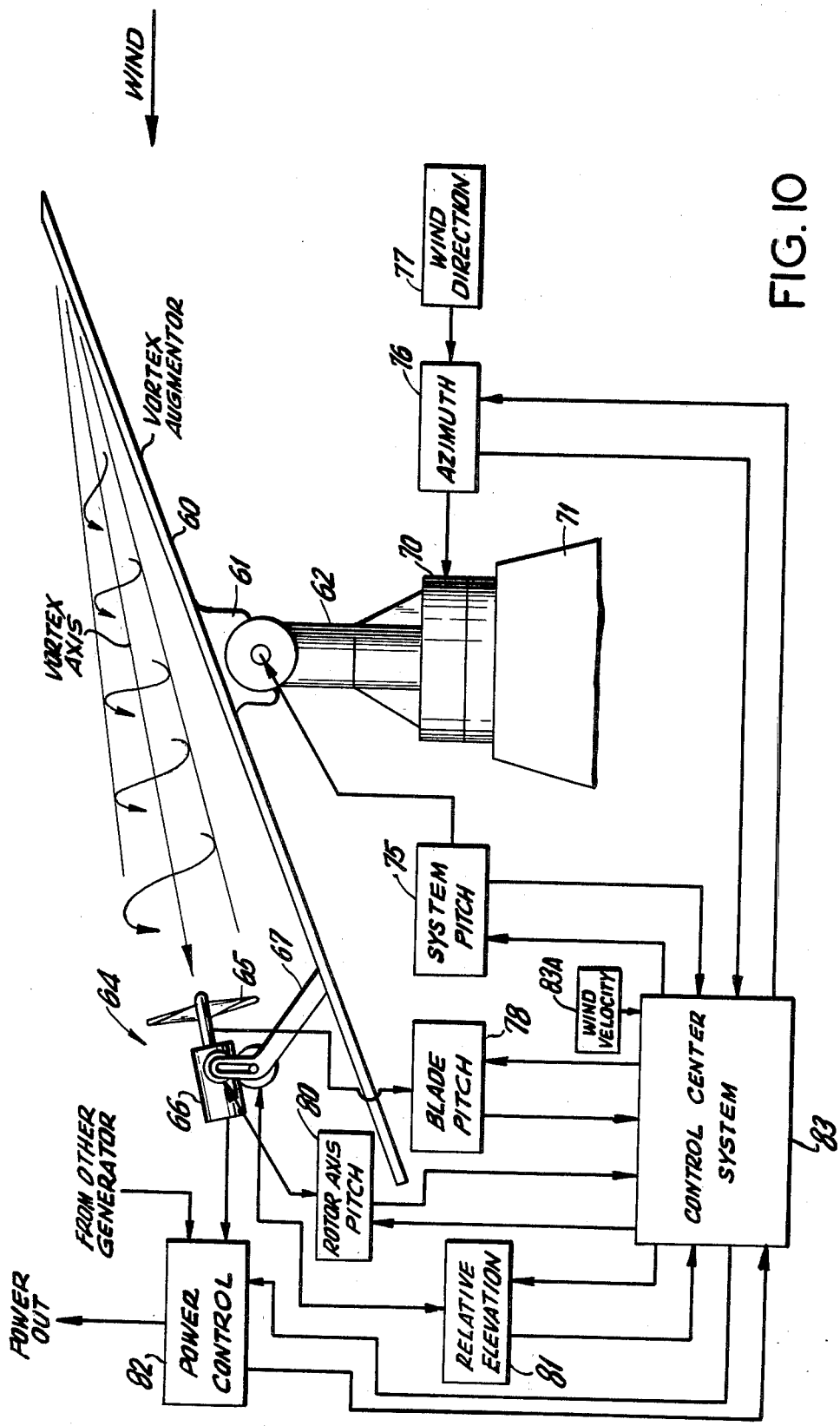
FIG. 10 is a schematic elevation view of a wind conversion system employing a delta augmentor with various control provisions illustrated.

Illustrating various control modes which may be practiced in implementing the vortex augmenting system is the schematic illustration of FIG. 10. In the system illustrated therein the aerodynamic augmentor 60 (which can be, for example, a delta planform) is pivotally mounted at bearing 61 on a support 62 fixed to a lower mount 70 rotatable on support 71. The pivotal action at 61 permits adjustment of the augmentor pitch angle to vary angle of attack while the rotary support permits rotation in the horizontal plane to track the natural wind vector.*

* i.e., to keep the augmentor unyawed relative to $V_W$

A pair of power turbines 64 are aligned relative to the vortices generated by augmentor 60 and are rotatably and slidably mounted on a support 67 secured in turn to the vortex augmentor 60 and thus movable with it. The turbines 64 each include a rotor 65 (for example, of the two-bladed type) coupled to the shaft of which is a generator 66.

A control system is provided for controlling the operation of the system. It includes a pitch channel 75 by which the pitch angle of the vortex augmentor may be adjusted thereby setting the angle of attack. Since vortex energy is a function of the angle of attack, the effective power extracted by the turbine blade 65 may thus be varied for control purposes.

The azimuth channel 76 of the control system may include a wind direction sensor 77 which through a suitable servo control system rotates the augmentor-turbine structure in yaw (or azimuth) until it is properly headed into the prevailing natural wind.

For regulating the power developed by the turbine blades, the rotor can include a blade pitch control system 78, as illustrated and for optimizing the orientation of the turbine with respect to the vortices generated by augmentor 60, the turbines may be controlled in pitch attitude via a rotor axis pitch channel 80. The elevation of the turbine relative to the augmentor may likewise be adjustable as indicated by the channel 81 designated REL. ELEV., to properly align the turbines and vortices.*

* For this purpose, spanwise positioning may be provided.

The power developed by the turbine generators 66 is fed to a power control regulator 82 which may be monitored and controlled by the control center 83 of the system to thereby control various of the above system control channels as a function of output power. The control system may also control the output power as a function of load requirement.**

** The control system may also require as an input, the undisturbed wind velocity, 83A.

The control channels illustrated in FIG. 10 may take various forms depending upon particular applications. Electric and/or hydraulic servo systems may be employed and, in some cases, mechanical linkages will suffice. In the design of these systems, the lift produced by the augmentor and the drag forces should be taken into account and in some applications may be utilized for drive purposes. The considerable body of art developed for the purposes of controlling the attitudes and positions of large antenna* structures, gun turrets and missile launchers may be drawn upon in implementing the control system designed for a particular application.

* and telescope

The augmenting system according to the invention is also capable of implementation in simple structures as well to meet requirements such as frequently exist in remote and primitive areas where simple, relatively lower power tasks are involved.

Figure 11:
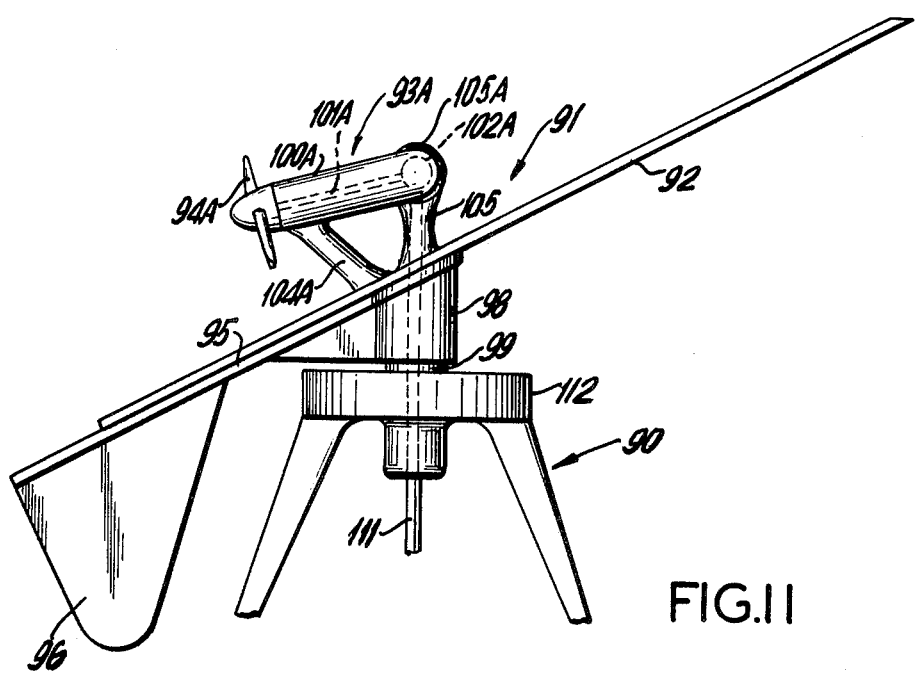
FIGS. 11 and 12 are elevation schematic and plan schematic views, respectively, illustrating another simplified system which may be employed in practicing the invention.
Figure 12:
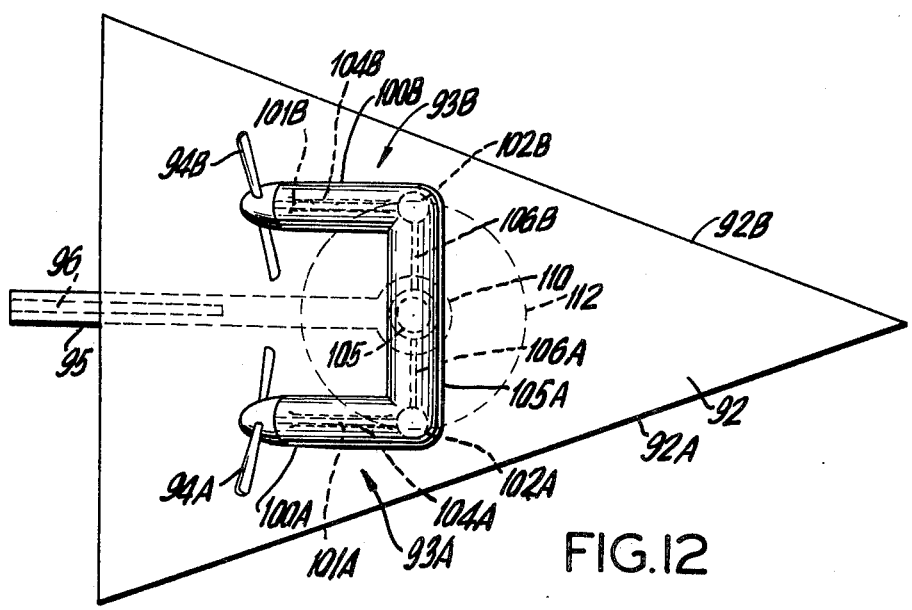

Referring to FIGS. 11 and 12 where such a system is illustrated, there is rotatably mounted on a supporting tower 90 a wind converter 91 including an augmentor 92 and a pair of turbines 93A and 93B having respective rotor blades 94A and 94B.

The converter 91 includes a tailpiece 95 fastened to the augmentor and on which a rudder 96 is mounted for providing weather vaning into the ambient wind. Rotary motion is effected through the rotary mounting of base 98 of converter 91 in bearing 99 of support tower 90.

The turbines 94A and 94B are rotatably mounted in respective nacelles 100A and 100B with the shafts 101A and 101B of the turbines each being housed therein and coupled at its respective end to a right angle drive 102A, 102B. Respective struts 104A and 104B and hollow "T" support 105 serve to support the turbines on the augmentor 92 with the horizontal section of 105, i.e. 105A, also enclosing the output shafts 106A and 106B of the right angle drives 102A and 102B. The distal end of these shafts are connected to a transmission 110, the output shaft 111 of which passes through base 98 and through the platform 112 of the tower 90 to thereby transmit power to the base of the tower. Rotating shaft 111 may be used directly through a mechanical drive for pumping, grinding and the like or may be used to drive a generator, compressor, heat converter or other form of power converter, depending upon the application.

MULTIPLE AUGMENTATION

Figure 13:
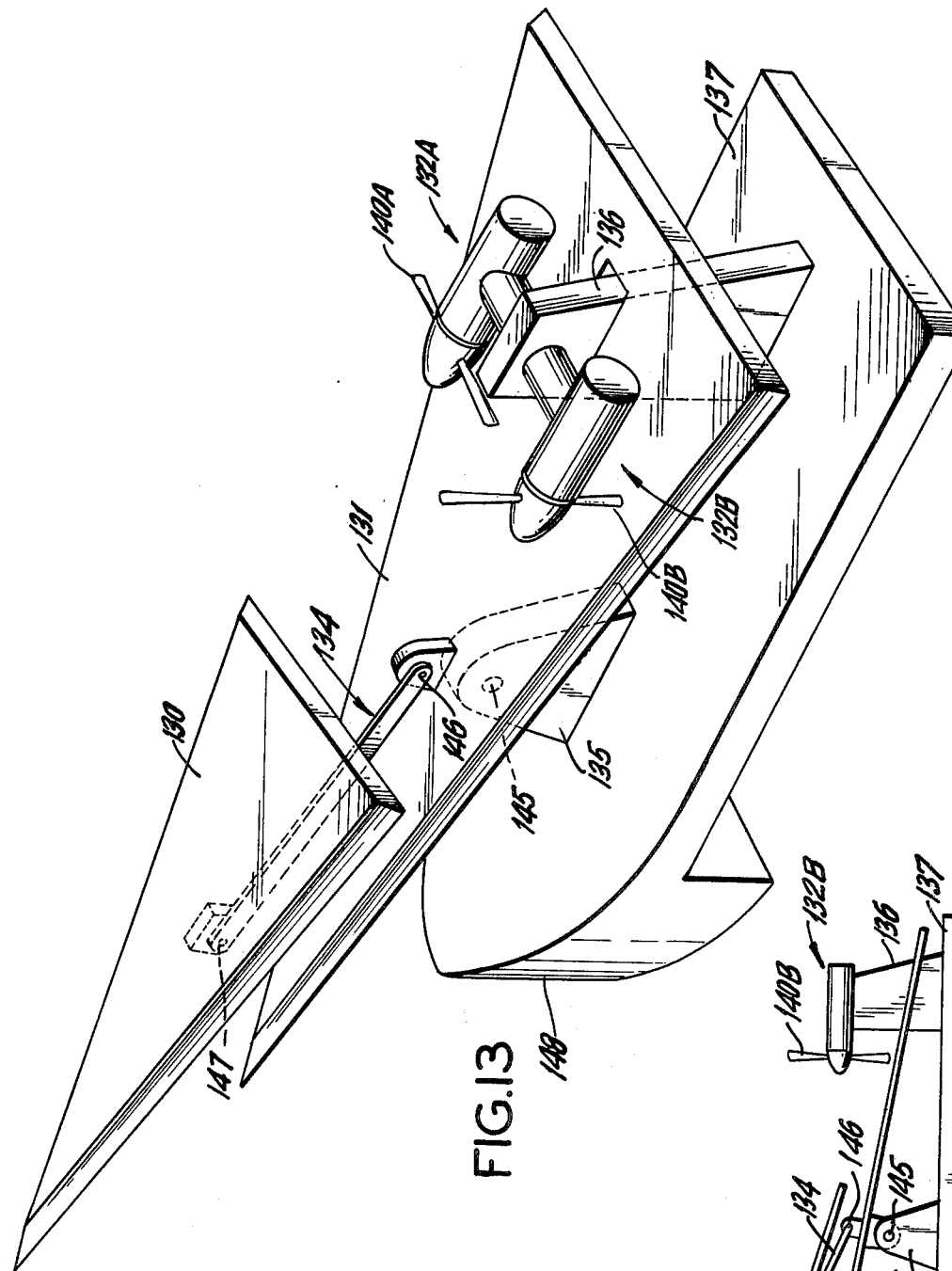
FIG. 13 is a perspective schematic view and FIG. 14 an elevation schematic view of another embodiment employing multiple augmentor surfaces, FIG. 14 being on reduced scale.
Figure 14:
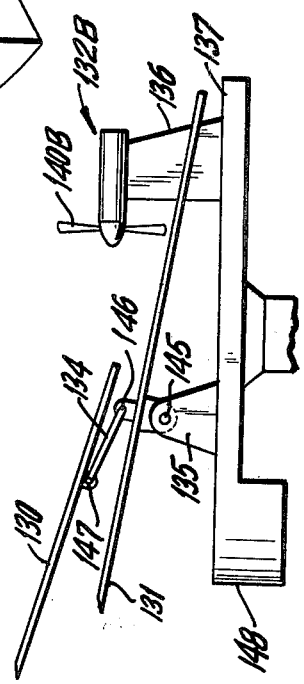

A schematic representation of a multiple augmenting system is illustrated in FIGS. 13 and 14 where two low aspect ratio deltas 130 and 131 are coupled together in a partially overlapping and partially tandem relationship for generating vortices which drive the turbines 132A and 132B. Augmentors 130 and 131 are coupled together with the aid of strut assembly 134, with the combination being pivotally mounted on a support 135. This support and the strut support 136 for the turbines are both fixed to a platform 137 which may be rotatable in azimuth on bearing 149 to track wind direction.

The turbines each utilize twin-bladed rotors 140A and 140B and these may drive in turn suitable power conversion devices, such as generators 141A and 141B, respectively.

Control system, not shown, may be coupled to pivot the augmentor pair at axis 145; and the relative orientation of deltas 130 and 131 may be varied by control systems, not shown, which produce pivotal action at axes 146 and/or 147.

The dimensions and relative orientation of the two augmentors 130 and 131 are such that their respective vortices combine in an in-phase relationship in the region of the turbine blades 140A and 140B thus producing a power capability which is enlarged to an even greater extent than that previously described.

For azimuth control a servo system may be employed or passive aerodynamic surfaces such as those associated with the nose section 148 of the platform 137 may be employed to position the platform 137 in azimuth on bearing 149 in accordance with wind direction.

VERTICAL SLENDER BODY VORTEX AUGMENTED SYSTEM

Figure 15A:
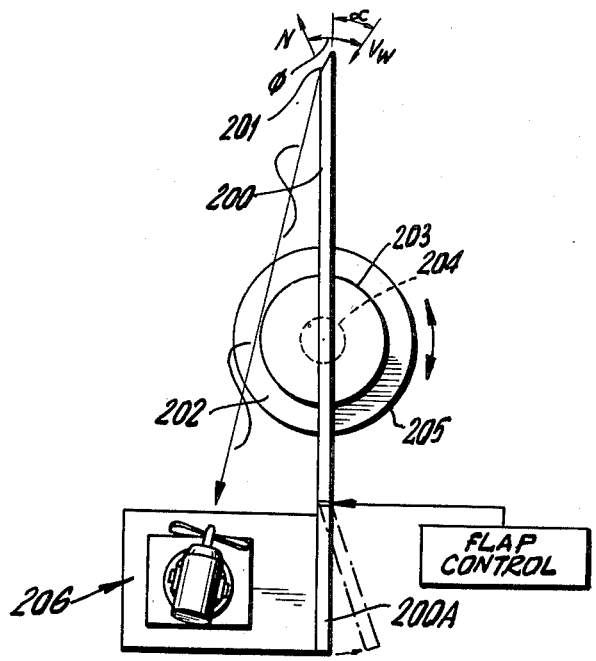
FIGS. 15A, 15B and 15C are schematic plan, side elevation and end elevation views, respectively, which illustrate vortex augmented wind conversion using a vertically oriented planform.
Figure 15B:
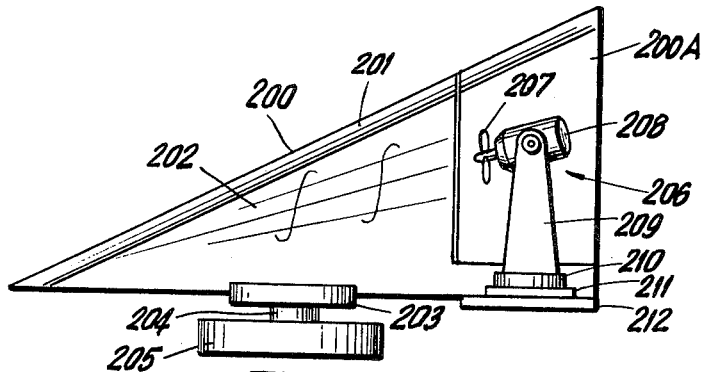
Figure 15C:
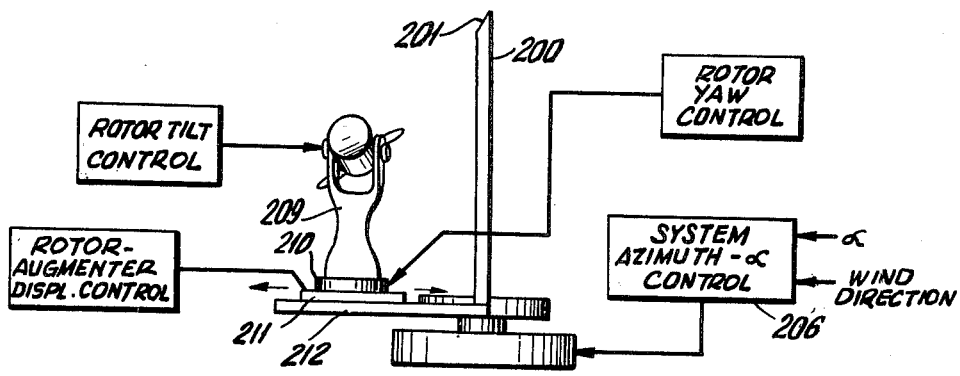

FIGS. 15A, 15B and 15C illustrate an embodiment employing a vortex generator in the form of a vertically oriented half-delta 200 having a plate-like surface configured as a right triangular planform. Augmentor 200 includes a leading edge 201 having a bevelled configuration to define a sharp-edged boundary where the flow separation occurs thereby generating the leading edge vortex as indicated schematically at 202.

Vortex generator 200 is secured in a base member 203 having a shaft 204 journalled in an azimuth driver schematically indicated at 205. Shaft 204 is located at a position relative to the center-of-moment in accordance with the requirements of the azimuth control system described below.

Rotary drive 205 is driven by the azimuth-α control system 206 schematically illustrated in FIG. 15C. The system, which may utilize conventional azimuth drive servo techniques, receives wind direction input together with the angle of attack setting and provides an output which energizes motor 205 to head the augmentor system in the direction of the wind vector but angularly offset therefrom by the desired angle of attack. The latter may be an adjustable input or may be fixed by choice of system parameters.

While azimuth control with the desired offset may also be achieved by the employment of a rudder or other aerodynamic surfaces, a positive servo type azimuth control system is preferred.

For converting the vortex energy, a turbine 206 is employed which includes a rotor assembly 207 and a generator 208 driven by the rotor. The entire turbine assembly 206 is illustratively pivoted on a turbine support 209 with rotor tilt adjusted by an appropriate rotor tilt control system as schematically indicated in FIG. 15C. The tiltable turbine system may be configured for rotary movement as well as by being mounted on rotary drive 210 controlled by a rotor yaw servo control system, also schematically indicated in FIG. 15C.

For supporting this combination, a displaceable carriage assembly 211 may be employed to permit linear displacement of the entire turbine system relative to the vortex generator 200. This carriage 211 may be driven by suitable displacement control means as indicated in FIG. 15C.*

*For vortex intensification the camber of surface 200 may be altered by deflecting flap 200A as shown in FIG. 15A.

The entire articulated rotor system may be suitably mounted as on a base such as 212 which is fixed to the augmentor 200 as indicated.

As shown in FIG. 15A, the system is operated to position the augmentor 200 at an angle of attack α with respect to the direction of the wind indicated by the vector $V_W$. As a consequence of this orientation, the component of wind velocity normal to the plane of the generator 200 instigates the flow separation at the leading edge 201 thus producing the vortex 202.

For converting the wind energy concentrated in the vortex the turbine is positioned at the proper angle of tilt and orientation to intercept the vortex for extracting its energy.

While the turbine in the illustrated embodiment has three degrees of freedom,* in a particular embodiment the optimum turbine orientation and position may be fixed in the design. Also, in those applications where the system is substantially elevated above ground level, it may be desirable to include a false ground or fence which lies, for example, approximately in the plane of the support 212 and which is dimensioned to simulate the effect of the natural ground.

*relative to generator 200

VORTEX AMPLIFIER AND WAKE DIFFUSER

The vortices generated by flow separation may be subjected to supplemental control means for optimizing their relation to the turbines. For further improvements in system performance, supplemental controls may also be incorporated for controlling the rotor wakes associated with the turbines to improve turbine performance.

Figure 16A:
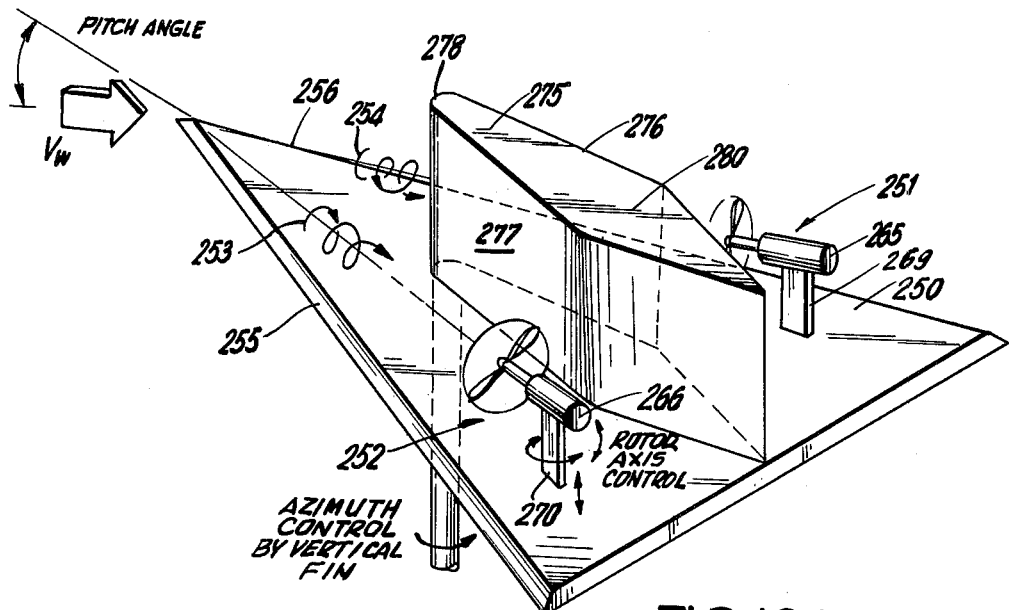
FIGS. 16A and 16B are schematic, isometric and elevation views of the augmentor system equipped with supplementary vortex and rotor wake control means, FIG. 16B being on reduced scale.
Figure 16B:
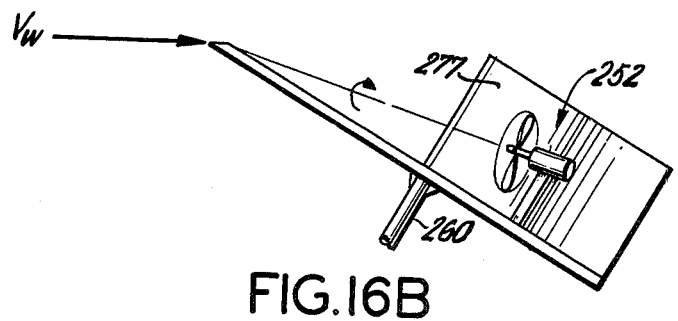

The system of FIGS. 16A, 16B an 16C illustrates the foregoing. It includes a delta planform 250 disposed generally horizontally together with turbines 251 and 252 mounted thereon and oriented to be driven by the vortices which are schematically illustrated at 253 and 254, respectively. These are generated by separation occurring at the sharp leading edges 255 and 256 of the vortex generating augmentor surface 250.

The augmented turbine system is secured to a shaft 260 which may be articulately mounted, as in the previously described embodiments, for movement in pitch and azimuth under control of servo systems.

The turbines 251 and 252 may include generators 265 and 266 with the combination mounted for articulation on supports 269 and 270, respectively, as hereinbefore described.

To form a favorable pressure gradient in the vortex region upstream of the turbines, a center body 275 is employed in the form of a tapered wedge having sides 276 and 277 diverging downstream in the spanwise direction. The wedge includes a curved nose 278 pointing generally upstream.

By reducing the available flow area on the augmentor surface between the rotor blades and the points of vortex formation, the center body produces a favorable drop in pressure which intensifies the vortex in the sense of increasing its velocity components. As a consequence, the energy density of the flow in the vortex region is increased above what would otherwise be obtained without the center body or its equivalent.

The incorporation of this vortex amplifier lends itself to the inclusion of rotor wake control means simply formed by the addition to the center body of the converging tail section 280. This structure has the effect of increasing the available flow area downstream of the rotor for improving pressure distribution in that area to thereby improve rotor efficiency.

Figure 16C:
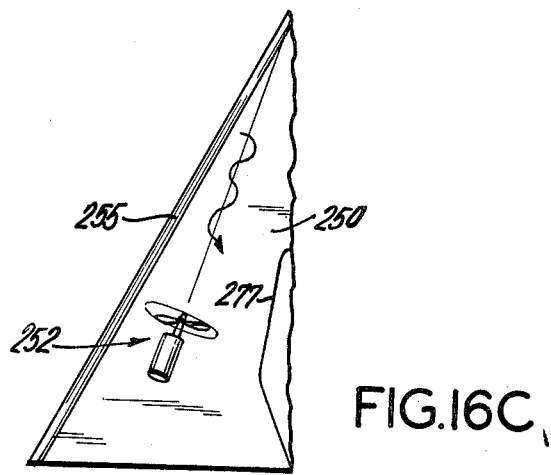
FIG. 16C is a partial plan view of the system of 16A and 16B and also serves as an elevation view of a vertical augmentor employing the modification of FIGS. 16A and 16B, FIG. 16C being on reduced scale.

While a fixed amplifier and rotor diffuser have been shown, these may also be articulated to provide flow control. Also, the supplementary vortex amplificaton and rotor wake control can be incorporated in vertically oriented augmentors as may be seen, for example, by treating FIG. 16C as a side elevation view of the type of augmenting system described in FIGS. 15A, 15B and 15C (with the base in the horizontal plane).

Instead of employing a passive aerodynamic surface for this vortex amplification and rotor wake control, dynamic control may be employed by replacing center body 275 with a suitably designed wind driven rotor whose characteristics and location can be designed to adjust conditions in the region of the vortex for optimizing the latter and/or its coupling to the respective turbine. Such an arrangement is depicted schematically in FIG. 17A where augmentor planform 250, one-half of which is shown, includes an active amplifying rotor 290 to optimize flow conditions in the region of vortex 253 between turbine 252 and the apex of the planform.

Figures 17A, 17B:
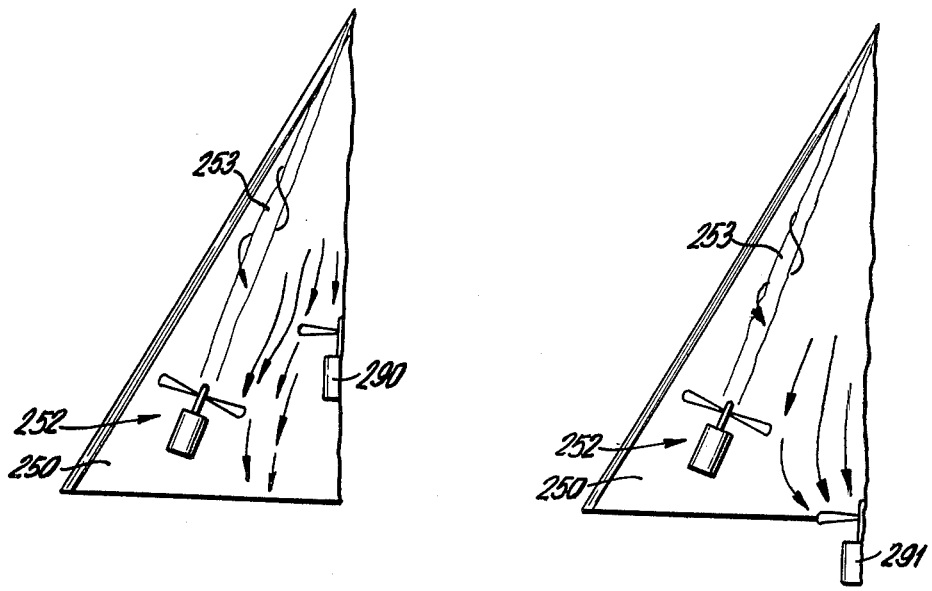
FIGS. 17A and 17B are each schematic plan views illustrating systems equipped with dynamic control means for the vortex and rotor wake, respectively.

This same active type control can be employed as shown in FIG. 17B to optimize wake conditions aft of the turbine 252. As illustrated therein, a rotor 291 (or rotor 290 translated downstream) is located and configured to effectively expand the flow area behind the turbine blades of turbine 252.

In both cases, power may also be extracted from the center rotor.

With the center rotor 291 located downstream of the main rotor, the expanding wake of the main rotor acts as an area increase ahead of the center rotor thus increasing the velocity of the flow seen by the center rotor and thereby increasing the power output of the center rotor. In addition, the inflow to the center rotor influences the expanding wake of the main rotor and aids in diffusing that flow and increasing the performance of that rotor.

In this configuration additional control is achieved over the efficiency and power output of the main rotors by a system which produces power in addition to that produced by the main rotors. The central rotor, or control rotor, does not necessarily require mounting on the augmentor center line nor is it necessary to have only one control rotor. In the case of the vertical augmentor a control rotor could be placed wherever appropriate to achieve comparable effects.

OMNIDIRECTIONAL AUGMENTATION

In some applications, particularly those requiring very large augmenting surfaces, a fixed augmentor array may be preferable over a rotatable one. Such a system is illustrated in FIGS. 16 and 16A.

In certain applications it may be desirable to employ stationary vortex augmentor surfaces. Since the wind is omnidirectional it is necessary to provide some means of insuring that the attitude of the augmentor surface is appropriate for any wind direction. To satisfy such conditions an array of augmentor surfaces in a generally circular fashion may be employed so that some augmentors are always facing into the wind.

It is appropriate in such an arrangement to provide at least one rotor system to extract the energy from that one or group of vortex flow fields generated by those augmentor surfaces that are heading into the wind. The rotor system may then be considered to be the moving portion of the system and provisions can be made to allow the rotor system to follow a track, pathway, or other suitable means, so that it may be lined up properly with the vortex having the appropriate energy characteristics.

Figure 19:
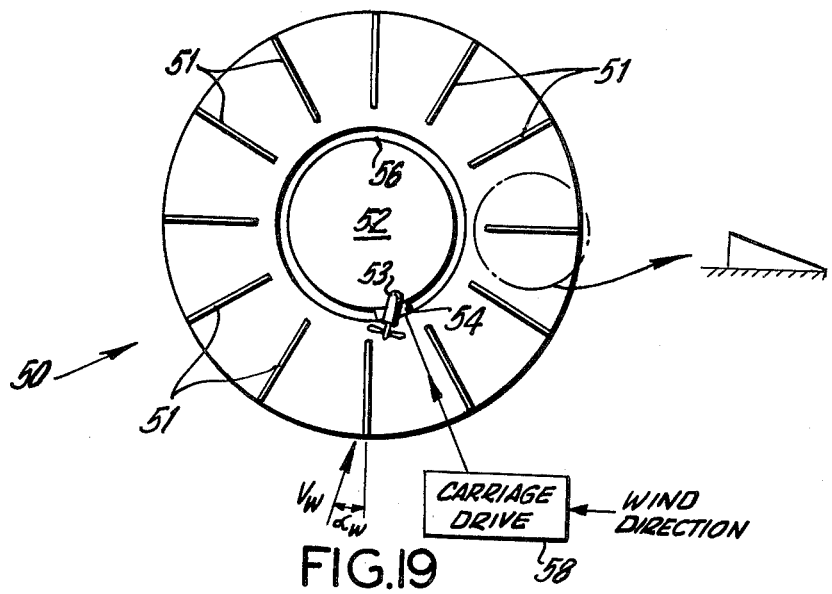
FIG. 19 is a plan schematic view of a system employing a stationary augmentor array.

One embodiment of this concept wherein vertical vortex augmentor surfaces are used is shown in FIG. 19. In this system there is provided a circular array 50 of vertically oriented augmentor surfaces 51 enclosing a circular region 52 wherein a turbine system 53 is mounted on a carriage 54 which moves on a circular coaxial track 56 so as to align the rotor system with the appropriate vortex, e.g. the one disposed at angle $\alpha_W$ to the wind vector $V_W$. The rotor system carriage, 53, as can be seen, has been moved so as to place the rotor system in the appropriate position. Of course it must be realized that with any given wind direction more than one augmentor surface may be generating vortices that may contain useful levels of power. Therefore the possibility of using more than one turbine carriage system is not excluded, in which case, a dispatch control system would be utilized to send each carriage to the appropriate location for any given wind direction. Whether one or more turbines is utilized, a carriage drive 58, responsive to wind direction is employed to drive the carriage to the appropriate vortex generator surface.

In the system of FIG. 19 the augmentor surfaces are employed in such a way that the sweepback angle of the leading edges of the surfaces is fixed but the angle of incidence with the wind of any augmentor surface varies from surface to surface around the array depending upon the direction of the wind.

An alternate embodiment of an omnidirectional vortex augmentor system utilizes (nominally) horizontal augmentor surfaces such as the previously described delta planform surfaces. These are arrayed in a circular pattern in a manner similar to the system of FIG. 19. The augmentor surfaces are set at an angle of incidence to the ground, and therefore to the direction of the wind. Again, regardless of the direction of the wind there will always be one surface heading into the general direction of the wind, and thus there is always at least one vortex which can be utilized for power extraction by the rotor system. The operation of this configuration is very similar to that previously described except that in this case the angle of incidence of the surface is fixed and the actual sweep back angle of the augmentor surface is variable. That is to say, since the actual sweep back angle is the angle included by the wind direction and the leading edge of the augmentor surface the actual sweepback angle will depend upon the geometry of the surface and the actual wind direction.

In all the omnidirectional systems discussed there is no requirement that any particular symmetry be observed. The details of the installation will depend on the particular application. Therefore it is possible to have an array of augmentor surfaces each of different shape or to have the augmentor surfaces directed at angles that are not symmetrically distributed about the center. Thus, at certain sites where local winds are generally most frequent and powerful in certain directions, fixed vortex augmentor surfaces can be arrayed at those fixed positions best suited to intercept the wind blowing in those directions and to provide for such fixed surfaces a movable rotor system which may be dispatched to that augmentor surface which is currently in one of the most favorable wind directions. In this way we may make best use of a single rotor system unit by positioning it among the fixed augmentor surface installations. An illustration of such a system would be similar to that in FIG. 10 with only selected augmentor surfaces provided, in correspondence with the most favorable wind directions.

In addition to the foregoing variations, some applications may dictate multiple cascaded arrays of augmentors, fixed or relatively movable. One example is a system of augmentors disposed in parallel rows such as may be seen in typical turbo-machinery blades. These arrays may also be vertical, where all vortex surfaces are stacked, one upon the other, with appropriate spaces between. In short the vortex augmentor systems described here may be used in groups arrayed in various combinations and distributions, with or without symmetry, while still providing the basic augmentor features as disclosed hereinbefore.

BLUFF BODY VORTEX AUGMENTED SYSTEM

Figure 18A:
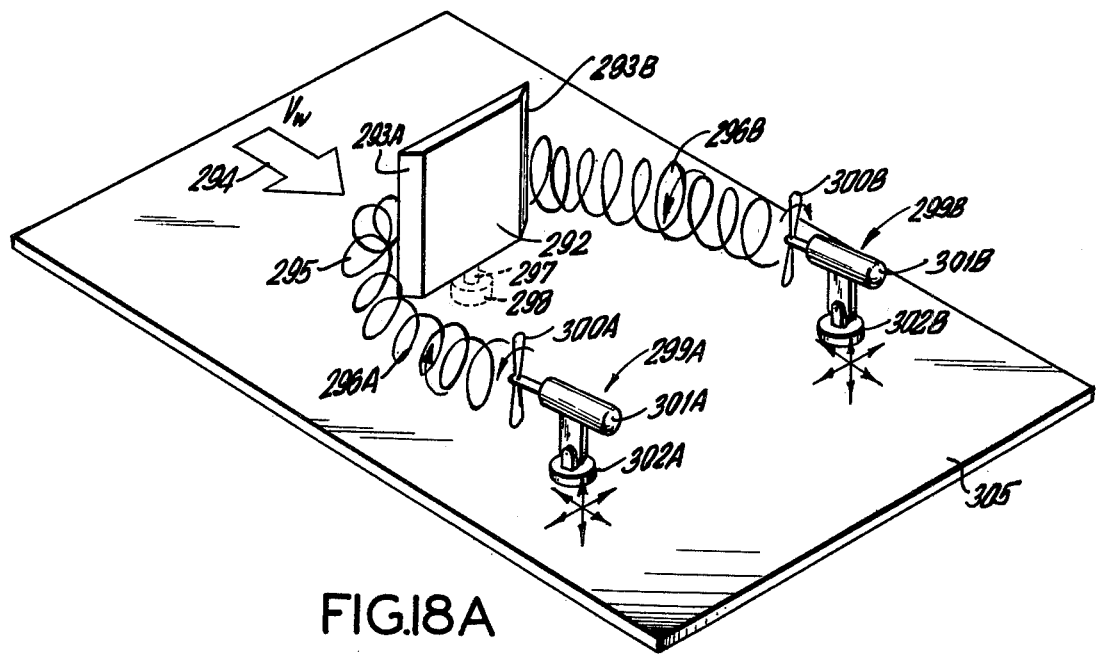
FIGS. 18A, 18B and 18C are schematic, isometric, plan and elevation views, respectively, illustrating vortex augmentation employing a bluff body, FIGS. 18B, 18C being on reduced scale.
Figure 18B:
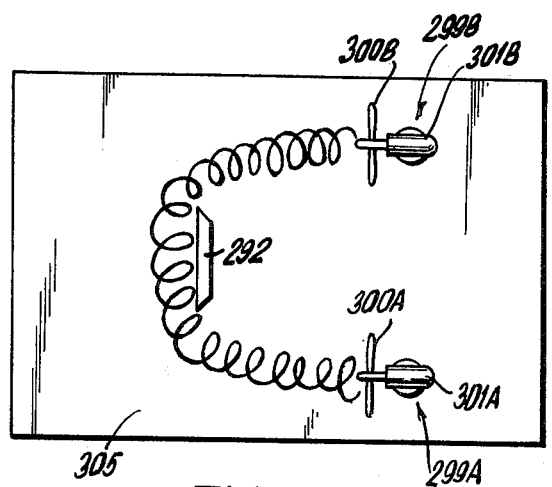
Figure 18C:
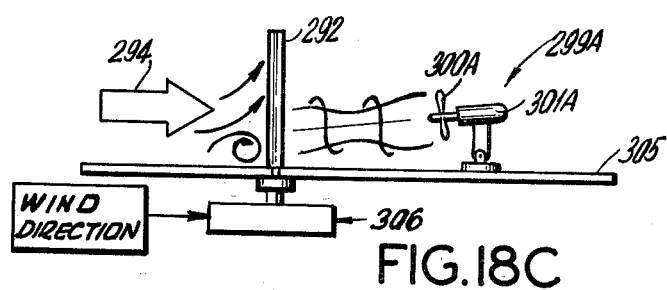

FIGS. 18A, 18B and 18C illustrate an embodiment employing a vortex generator in the form of a bluff body.

In this application the bluff body is illustratively in the form of a vertical square plate 292 whose bottom side lies on or near the ground plane 305 and whose side edges 293A and 293B are sharply champfered in form. Ground plane 305 is rotatably mounted in azimuth drive 306 which may be actuated according to wind direction. Plate 292 is oriented with its broad surface normal to the oncoming wind velocity vector 294. Alternatively, passive azimuth control as previously described may be employed, or all positive drive may be eliminated since the condition of being normal to the wind velocity vector can be a stable state for a symmetric bluff body whereby it tends to align itself properly due to the aerodynamic forces acting upon it.

The oncoming flow exemplified by vector $V_W$ divides in order to pass completely around the plate 292 and in so doing forms the vortex 295 which is "wrapped" around the plate and streams back from the sides 293A and 293B thereof in the form of "trailing" vortices 296A and 296B. For converting the vortex energy in the streams, turbines 299A and 299B are employed. Each includes rotor assemblies 300A and 300B and a respective generator 301A and 301B driven by the rotor. The turbine assemblies 299A and 299B are illustratively mounted on turbine supports 302A and 302B which may permit pivotal and rotational movement for attitude control for the turbine assemblies 299A and 299B in the manner previously described. Whether predetermined in a fixed design, or adjustable, the axis of each rotor 300A and 300B is aligned with the axis of the respective trailing vortices 296A and 296B.

ADDITIONAL FEATURES

There are other features which may be incorporated into the vortex augmenting system including, for example, the addition of boundary layer fences to ameliorate spanwise flow of the boundary layer, blowing and suction slots for extra boundary layer control, and means for providing dihedral or anhedral for the wing as well as for washing in or washing out at the delta tips. These and other design improvements may be adopted according to the requirements of particular applications.

METHODS AND MATERIALS OF CONSTRUCTION

Known construction techniques may be utilized in practicing the invention; methods of aircraft construction are particularly suitable for the slender body vortex generators although it is likely that less stringency in the requirements of the structure may be observed. That is, there are cases where the size may permit construction from solid sheets of material and those where spar, rib and skin techniques are more appropriate. In any event the augmentor structure will be less severely stressed than an equivalent size airplane structure and will not be subject to the same stringent safety requirements.

Materials will also vary according to application. In general any suitably strong, durable combination is appropriate: wood and fabric, e.g. canvas, wood and veneer or metal skin, metal, plastic, etc. Where application requirements permit, a very light and inexpensive structure may be employed consisting of a rigid cable frame forming the leading edges and the trailing edge, with this frame covered by a thin membrane (e.g., cloth or plastic.

VORTEX MIXING SYSTEMS

The natural winds vary in speed at different heights above the surface of the earth. The velocity starts out at zero on the surface, increases rapidly with height up to about 500 feet and then increases more slowly up to 1,500 feet or so. The curve 320 of FIG. 20C, which plots wind velocity as a function of elevation, graphically depicts this relationship.

This first 1,500 feet of the atmosphere is usually called the atmospheric boundary layer. It has many features in common with the classical turbulent boundary layer described in the literature of fluid dynamics. (See F. M. White, *Viscous Fluid Flow*, McGraw Hill Book Co., N.Y., 1974.) The reason for this large variation in wind speed with vertical height is the presence of retarding forces associated with friction between the air and the surface of the earth and the natural or artificial obstructions that may be present on the surface.

With larger obstructions forming a "coarse" surface profile, the wind velocity will climb at a relatively slow rate to its maximum value at the upper reaches of the boundary layer. Therefore, the velocity gradient will generally be lowest in the vicinity of developed urban areas, moderate in rural areas with rolling terrain and highest over level plains and at sea. For given low values of elevation, the absolute wind velocity "in situ" will vary in this same manner.

In the attempt to harness the power of the wind, it is logical to place the power converter at a point where the winds have achieved a value as close to the maximum as possible. Thus it is desirable, other factors being equal, to place a wind power converter at the highest practical altitude. This objective requires large expenditures for the construction of suitable support towers for the power converter. In addition there are other disadvantages associated with very high towers including, for example, danger to local air traffic, safety considerations arising from possible failure of the tower, and lack of esthetic appeal.

In order to overcome these difficulties and yet have the wind converter face a wind velocity profile as "full" and uniform as possible it is desirable to have some means of disturbing the natural vertical mixing currents in the atmosphere so that high velocity air from higher altitudes can be mixed with low velocity air from lower altitudes in such a way that the velocity profile achieves the desired uniformity at a relatively high average velocity level and, further, so that this occurs down at reasonably low altitudes. The need for extensive towers can thereby be eliminated or mitigated.

There is yet another reason why this uniformity of profile is desirable especially for large rotors, say those of 100 foot diameter or more: the gradient of velocity subjects the rotor to different conditions of velocity depending on whether the blade of the rotor is at the lowest point of its cycle or at its highest point. When the gradient of wind velocity is severe such rotors may require cyclic pitch control devices to vary the pitch of the blade of the rotor depending on its position in the cycle. This can require a complicated control mechanism and a major saving would result if it could be eliminated by facing the rotor into a uniform oncoming wind.

One solution to these problems is to employ vortex generation, such as provided by the slender or bluff body vortex generators described hereinbefore, the resultant vortices being used to produce a flow field which can interact with the natural wind in such a way as to provide a large improvement in the uniformity of the oncoming wind profile downstream of these vortex generators. A single vortex generator or a cascaded array of such generators can provide a more uniform wind profile at relatively high average velocity in an extended region downstream thereof.

Vortex generators of small scale have been used for many years on aircraft wings and similar flow boundaries to aid in the control of the boundary layer over the wing or surface in question. In particular these devices are used to delay boundary layer separation and do so by producing a vortex flow field with the core axis aligned with the main direction of the flow. The resultant spinning vortex field carries high momentum fluid from the upper portion of the boundary layer to regions near the surface and low momentum fluid up from the surface to the outer part of the boundary layer. This mixing action tends to produce a more uniform velocity profile with the previously small gradient steepened and confined to a region much closer to the surface. This new "fuller" velocity profile can penetrate into the region of advance pressure gradient usually encountered in the aft portion of the wing, for example. Investigations on a laboratory scale with such devices have been reported by G. B. Schubauer and W. G. Spangenberg in the Journal of Fluid Mechanics, Vol. 8, part 1, May 1960.

In the present context a system employing single or multiple, e.g. cascaded, vortex generators may be arranged for rotation to an appropriate angle relative to the oncoming wind. This may be done by a drive system responsive to the direction of the wind as sensed by appropriate velocity-direction sensors, or by employing integral aerodynamic surfaces in the design.

When headed at the appropriate angle concentrated vortices will be generated from the vortex generator and will flow along with the wind, interacting with it in the manner described previously. That is, the whirling action of the vortices causes a mixing process whereby high level, high velocity wind is brought down closer to the surface, and lower level, low velocity wind is transported up to a higher level. At a distance downstream of this array, the distance depending on the size and details of design of the vortex generator, the velocity profile will be much fuller and uniform than it would be at the same location with no vortex mixers upstream.

Laboratory tests reported in Schubauer and Spangenberg, ibid, indicate that this technique can increase the velocity and "fill out" the profile in the lower levels of the atmospheric boundary layer where the velocity gradient is more pronounced. It is then possible to place at these appropriate downstream locations a wind power converter to intercept this enhanced velocity field.

Figure 20A:
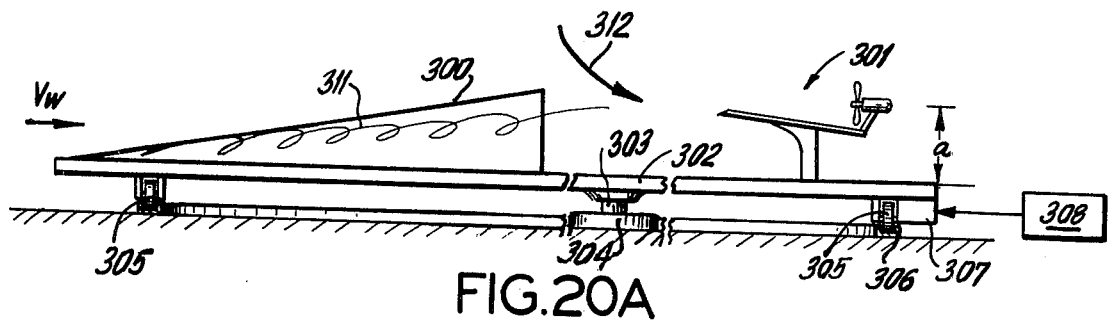
FIGS. 20A and 20B are schematic elevation and plan views, respectively, which illustrate vortex mixing techniques used to increase the wind velocity at the turbine site
Figure 20B:
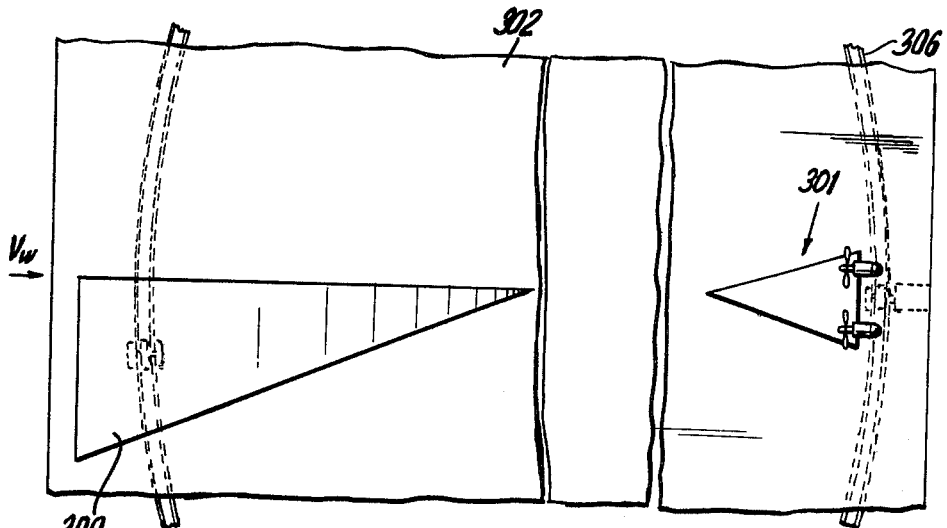

Various types of wind converter systems can benefit from such an enhanced wind field, including conventional types as well as the vortex augmentor systems hereinbefore described. An implementation of the latter is schematically illustrated in FIGS. 20A and 20B.

Figure 3:
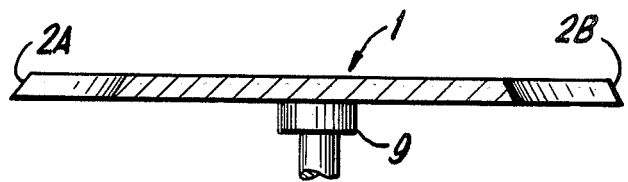
FIG. 3 is a cross-sectional view on enlarged scale taken along lines A—A of FIG. 1, of the augmentor surface.

The illustrated system employs a vortex mixer 300 in the form of a ramp, and downstream thereof, a planform augmentor wind converter system 301 such as previously described, e.g. the embodiment of FIGS. 1–3. The mixer and augmented converter are mounted on a generally planar support 302 having a central shaft 303 journalled for rotation in bearing assembly 304. Two or more wheels 305 connected to the periphery of support 302 and aligned in a circular track 306 provide additional support and guidance for the system.

For rotating the system into proper alignment with the wind $V_W$, suitable drive means such as a servo motor and control 307 may be employed, the control circuits of the latter receiving a wind direction input signal from a suitable sensor 308.

When properly aligned relative to the wind, mixer 300 generates vortices such as those symbolized at 310 and 311, the effect of which is to induce the previously described mixing effect symbolized by the flow line 312.

As a consequence the augmented wind converter 301 is exposed to a more uniform wind gradient and higher value wind velocity than would otherwise be the case. Higher outputs from the turbines of the converter result. In one embodiment the wind converter 301 is located at least several ramp-lengths downstream of the apex of ramp 300.

Figure 20C:
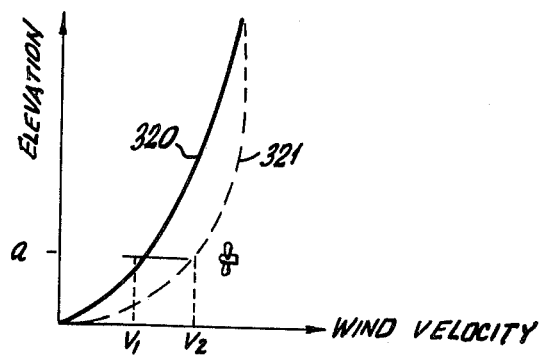
FIG. 20C is a coordinate graph illustrating the increase in wind velocity achieved at the vortex generating site using a vortex mixer.

This effect is depicted in FIG. 20C, the curve 321 reflecting these conditions at converter site elevation "a" as compared with the velocity-altitude conditions 320 otherwise obtaining at that location.

Later developments in the vortex augmentor concept may be found in "Flow Measurements in Leading Edge Vortices", Sforza, et al., AIAA Fifteenth Aerospace Sciences Meeting, Los Angeles, January 24–26, 1977, Publication No. 77-11.

What is claimed is:

1. An energy conversion system converting the energy of natural fluid flow as in winds or waterways, to useful output power comprising bluff body vortex generating means adapted to intercept said natural fluid flow and to generate an edge separation vortex having a substantial axial velocity component, and turbine means positioned in the developed region of said vortex for extracting energy from said vortex.

2. A system as defined in claim 1 in which said bluff body comprises a vertically oriented platelike structure having a planar surface adapted to be orthogonal to said fluid flow.

3. A system as defined in claim 2 in which said bluff body is mounted on a generally horizontal and planar support and said turbine means are also mounted on said support.

4. A system as defined in claim 2 in which said turbine means include at least one rotor having blades configured in accordance with the velocity conditions of said vortex generated by said bluff body.

5. A method of converting the energy of diffuse natural fluid flow into output power comprising the steps of generating an edge separation vortex having a substantial axial velocity component for concentrating said diffuse flow into a vortex by intercepting said diffuse flow with a bluff body, and directing said vortex to interact with turbine means for extracting the energy in said vortex.

* * * * *